Sept. 15, 1959   B. FRIEBERG   2,904,349
DRAFTGEAR IN TRACTORS AND LIKE VEHICLES
Filed March 24, 1958   4 Sheets-Sheet 3

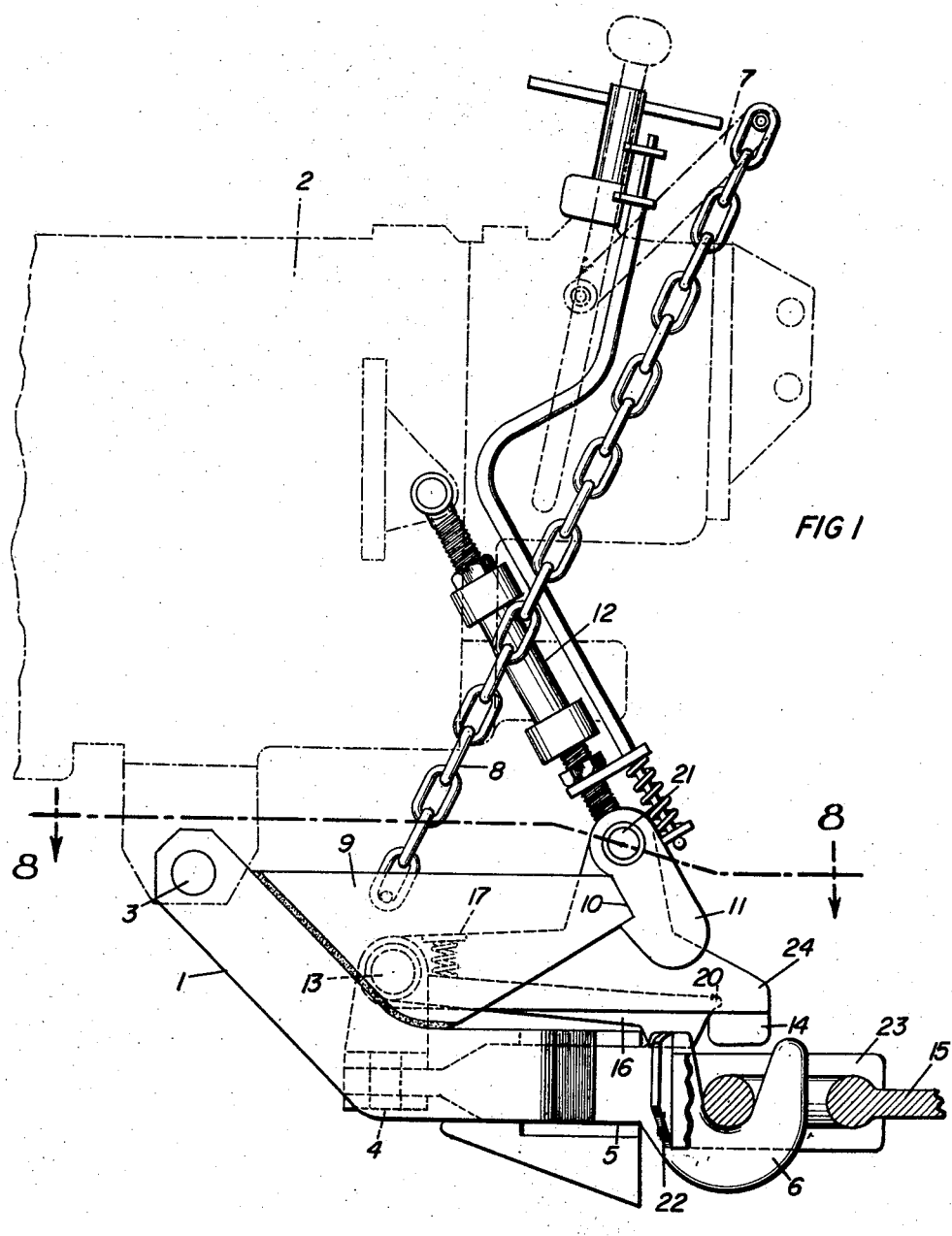
Bengt Frieberg

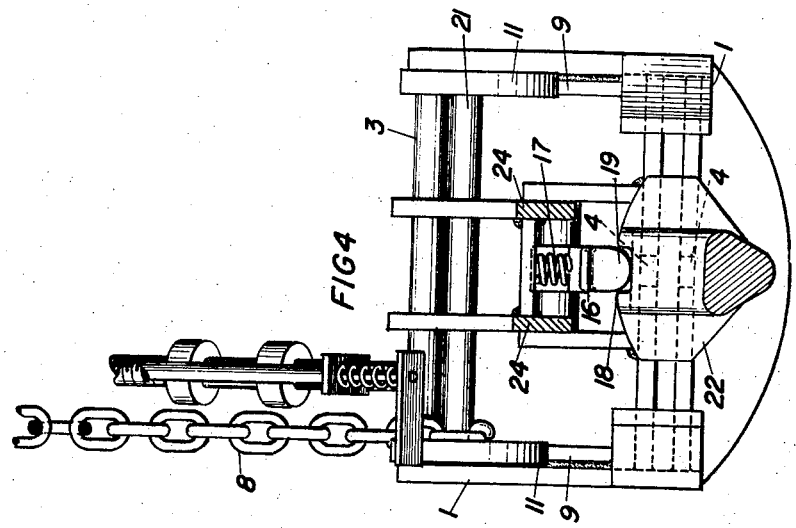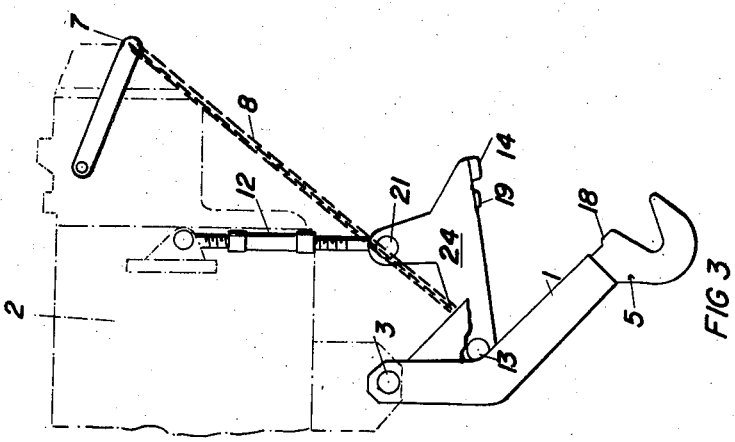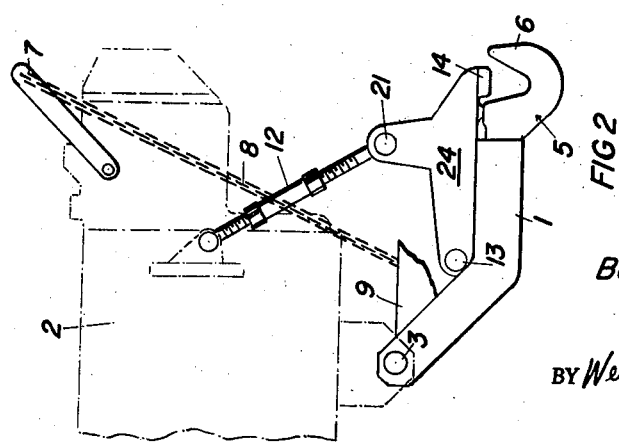

INVENTOR
Bengt Frieberg

BY Wenderoth, Lind and Ponack
ATTORNEYS

Sept. 15, 1959            B. FRIEBERG           2,904,349
DRAFTGEAR IN TRACTORS AND LIKE VEHICLES
Filed March 24, 1958                         4 Sheets-Sheet 4
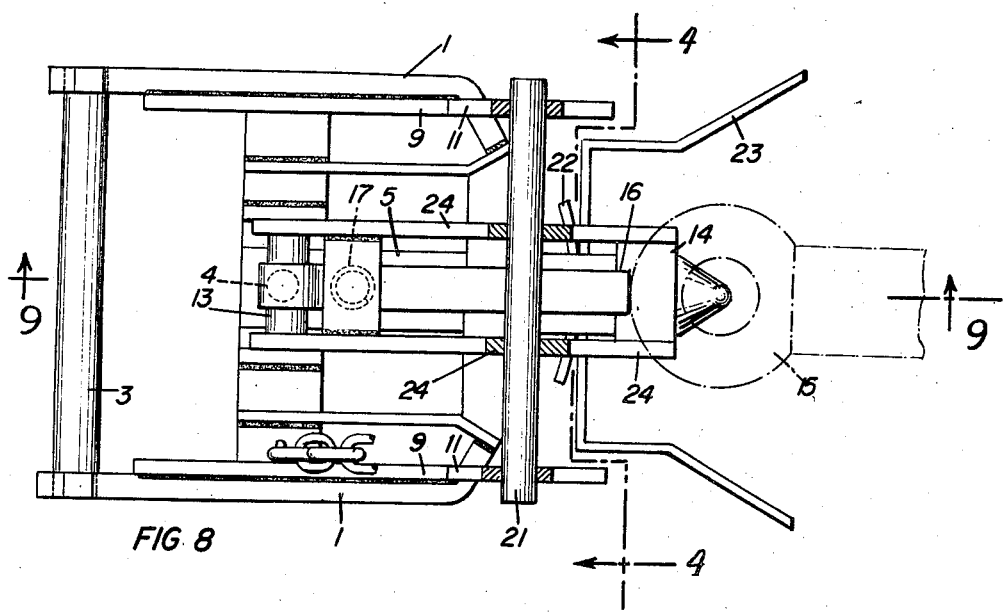
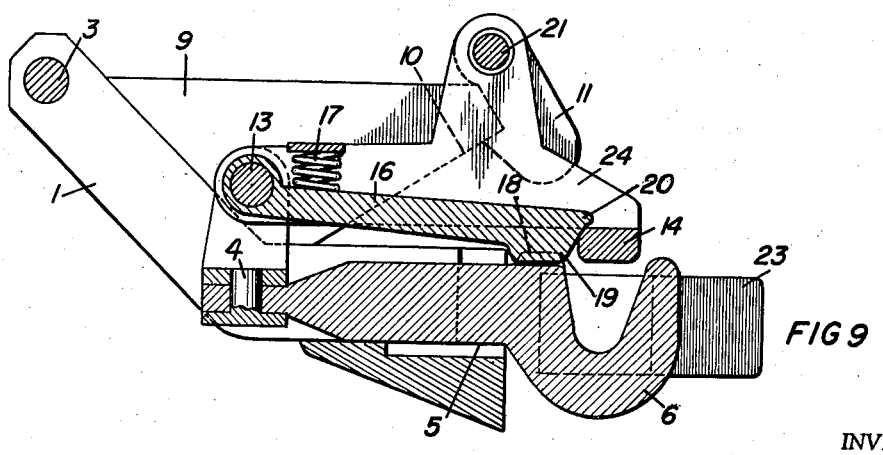
INVENTOR
*Bengt Frieberg*
BY *Wenderoth, Lind and Ponack*
ATTORNEYS United States Patent Office 2,904,349
Patented Sept. 15, 1959

2,904,349

DRAFTGEAR IN TRACTORS AND LIKE VEHICLES

Bengt Frieberg, Linkoping, Sweden, assignor to Lihnell Vagn Aktiebolag, Braas, Sweden, a corporation of Sweden Application March 24, 1958, Serial No. 723,456

Claims priority, application Sweden July 10, 1957

4 Claims. (Cl. 280—479)

This invention relates to draftgear in tractors and like vehicles which comprises a hooked drawbar which is so mounted on the vehicle that its hooked end can be raised or lowered by operating means on the vehicle, locking means permitting the retention of said hooked end of the drawbar at a predetermined height position.

The primary object of the invention is to provide a draftgear in which the drawbar is also capable of pivoting laterally, said pivoting movement being blocked when the drawbar coincides with the longitudinal axis of the vehicle and its hooked end occupies the predetermined height position. The invention makes it much simpler than heretofore to couple a trailer to a tractor or like draft vehicle, as the lateral pivoting movement of the drawbar eliminates the high demands otherwise put on the driver's skill when backing the draft vehicle up to a trailer which is to be coupled to the draft vehicle. A prerequisite condition of course is that all operations can be performed from the driver's seat on the draft vehicle.

Further objects of the invention and the advantages gained thereby will become apparent from the following description, reference being had to the accompanying drawings showing an embodiment, chosen by way of example, of the draftgear according to the present invention. In the drawings:

Fig. 1 is a side elevation of the draftgear mounted on a tractor;

Figs. 2 and 3 are schematic side elevations of the draftgear in a number of different height positions;

Fig. 4 is a section on line 4—4 of Fig. 8;

Fig. 8 is a section on line 8—8 of Fig. 1; and

Fig. 9 is a section on line 9—9 of Fig. 8.

Figure 7:
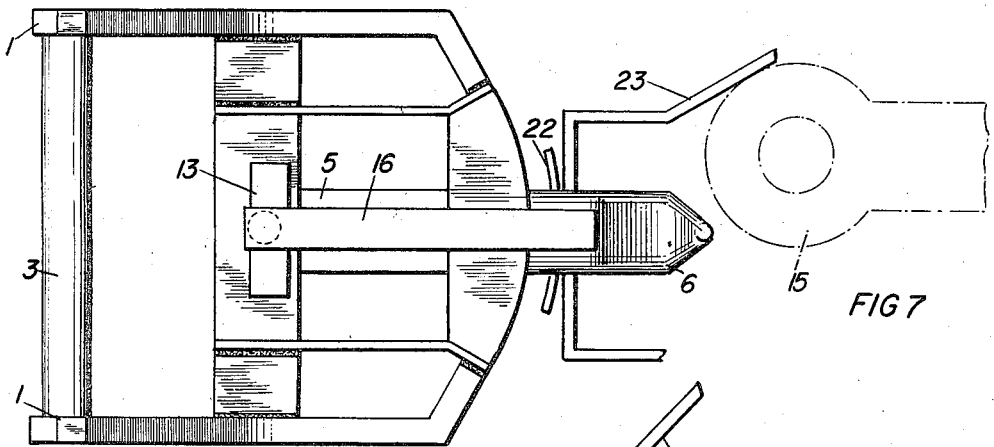
Figs. 5 to 7 are schematic plan views of the draftgear when coupling is effected.

A mainly U-shaped draft yoke 1 has its limb ends pivotally mounted on a shaft 3 horizontally disposed on the tractor 2. The yoke 1 constitutes the frame for a vertical shaft 4 centrally disposed therein. A drawbar 5 has its one end pivotally mounted on said shaft 4 and its other end equipped with a hook 6.

By swinging the yoke 1 about the shaft 3 the hook 6 can be raised and lowered. Said raising and lowering movement of the hook is brought about by means of a lever 7 which is mounted for swinging movement on the tractor 2, the movement of the lever 7 being transmitted to the yoke 1 by means of chains 8 or like means which are yieldable in one direction, such as telescoping arms. As will appear from the following description, the lever 7 can be used, due to said arrangement, for other tasks after the coupling has been completed.

Welded to the limbs of the draft yoke 1 are metal plates 9, and their ends 10 remote from the shaft 3 are adapted to cooperate with hook means 11 which are connected to the tractor 2. Said hook means 11 constitute a locking device which locks the draft yoke 1 and thus the hook in a certain height position. This height position can be set by means of extendable screws 12 or the like connecting the hook means 11 to the tractor 2. The hook means 11 are adapted to be released from the driver's seat on the tractor. Before such a release can take place, the levers 7 must be raised somewhat to relieve the load on the draft yoke 1.

The yoke 1 is applied with a horizontal shaft 13 on which a locking means 14 is pivotally mounted. Said locking means is adapted, in that position of the yoke 1 in which it is locked by the hook means 11, to prevent the hook engaging member 15, that is the draft eye of the trailing vehicle, from coming loose from the hook 6.

The lateral swinging movement of the drawbar 5 can be blocked when the drawbar 5 coincides with the longitudinal direction of the vehicle 2 and the hook 6 occupies the predetermined height position defined by said hook means 11. The blocking device for this swinging movement consists of an arm 16 which is pivotally mounted on the yoke 1 and which, by the action of a spring 17 or the like, is urged towards the drawbar 5 which has a recess 18 for a projection 19 on said arm 16, or vice versa.

In the preferred embodiment shown, the locking means 14 is constituted by a plate which is secured to two arms 24 pivotally mounted on the shaft 13, the blocking arm 16 being disposed between said two arms 24 and provided with a projection 20 or the like which is adapted to cooperate with the plate 14 for restricting the pivoting movement of the blocking arm 16 towards the drawbar 5. In this instance, the blocking arm 16 is preferably mounted on the shaft 13.

By means of a horizontal shaft 21 or the like the arms 24 are connected to the extendable screws 12 so that neither the locking means 14 nor the blocking device 16 can take part in the swinging movement of the draft yoke 1, as is clearly apparent from Figs. 2 and 3.

To facilitate moving the projection 19 of the blocking arm 16 into engagement with the recess 18, the hook 6 is provided on both sides with plates 22 having curved upper edges for this purpose, as will appear from Fig. 4.

Figure 6:
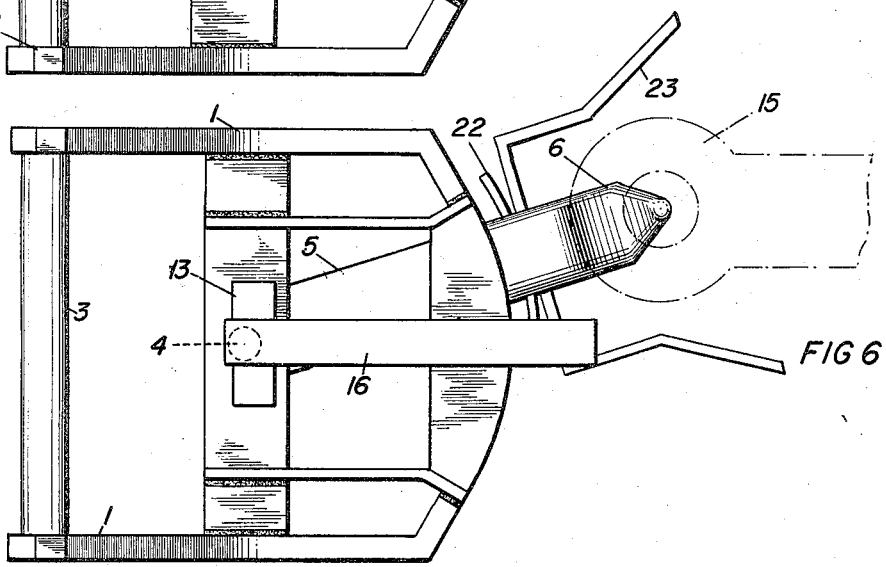
Figure 5:
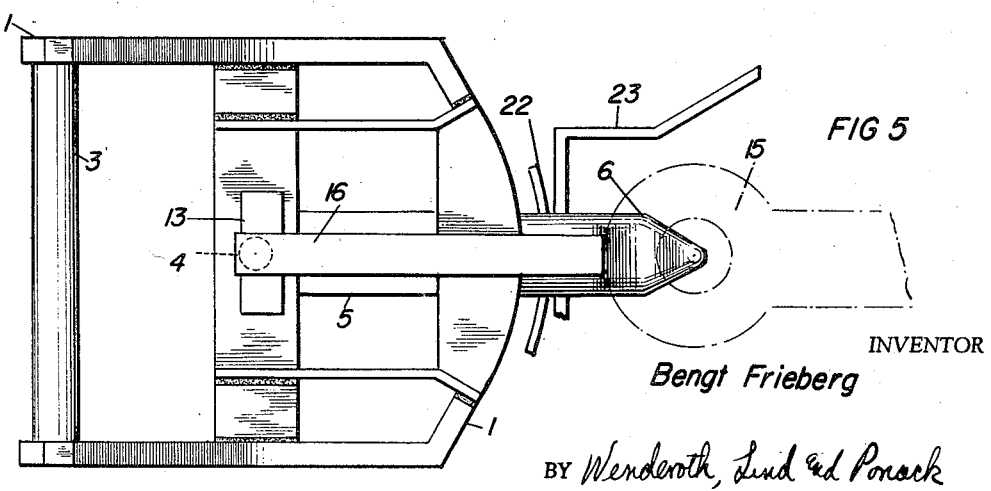

As will be seen from Figs. 5 to 7, the drawbar 5 is provided on both sides of the hook 6 with substantially vertical guide members 23 which are inclined with respect to the direction of travel and adapted to guide the drawbar 5 when coupling is effected. When the drawbar 5 is not locked and freely swingable horizontally, the draft eye 15 of the trailing vehicle, when the tractor is backed up to said vehicle, moves the drawbar 5 laterally, if necessary, into a position in which the hook 6 is situated exactly below the draft eye 15 so that coupling can take place immediately by raising the yoke 1 by means of the lever 7. The gap between the guide members 23 should be large enough so that the draft eye 15 will strike them both when it is situated precisely above the hook 6.

While a preferred embodiment of the invention has been described above and shown in the drawings, it is understood that the invention is not limited thereto, as many modifications may be resorted to within the scope of the appended claims.

What I claim and desire to secure by Letters Patent is:

1. A draftgear in tractors and like vehicles comprising draft yoke means pivotally mounted on a horizontal shaft on said tractor, a vertical shaft mounted on said draft yoke means, a drawbar having one end pivotally mounted on said vertical shaft of said draft yoke means, a hook at the free end of said drawbar, operating means on the tractor engaging said yoke means for raising and lowering the hooked end of said drawbar, locking means on said yoke means and said tractor, respectively, for locking the drawbar in a predetermined height position, and blocking means on said yoke means and said drawbar, respectively, for blocking the lateral swinging movement of the drawbar when the latter coincides with the longitudinal direction of the tractor and the hooked end of said drawbar occupies said predetermined height position, said blocking means comprising an arm pivotally mounted on the draft yoke means and tending under spring action to swing towards the drawbar, and a projection engaging in a recess in the drawbar when said pivotally mounted blocking arm is swung into contact with the drawbar, and further locking means on said draft yoke means engaging the drawbar in the predetermined height position of the hooked end thereof so as to prevent the hook engaging member on the trailing vehicle from coming loose from the hook on said drawbar.

2. A draftgear as claimed in claim 1, in which said further locking means comprise two arms pivotally mounted on the draft yoke means, and a plate secured to said two arms, and in which the arm of said blocking means has its end provided with a projection adapted to cooperate with said plate to restrict the swinging movement of said blocking arm towards the drawbar.

3. A draftgear as claimed in claim 1, in which the pivot axis of the arms of said further locking means constitutes also the pivot axis of the blocking arm.

4. A draftgear as claimed in claim 1 in which said locking means comprise two arms on said yoke means, a hook means engaging each arm, a horizontal shaft between said hook means on which said hook means are mounted, and an adjustable length supporting means connected between said shaft and said tractor.

References Cited in the file of this patent
UNITED STATES PATENTS

| | | |
|---|---|---|
| 1,939,950 | Brown | Dec. 19, 1933 |
| 2,151,181 | Appell | Mar. 21, 1939 |
| 2,462,726 | Currie | Feb. 22, 1949 |
| 2,534,109 | De Witt | Dec. 12, 1950 |
| 2,678,222 | Payzant | May 11, 1954 |
| 2,791,444 | McNeice | May 7, 1957 |

FOREIGN PATENTS

| | | |
|---|---|---|
| 436,704 | Germany | Nov. 6, 1926 |
| 88,588 | Norway | Jan. 14, 1957 |